No. 746,878.  
PATENTED DEC. 15, 1903.
C. F. REICHELT.  
SUPPORT FOR VESSEL COVERS.  
APPLICATION FILED MAR. 2, 1903.
NO MODEL.
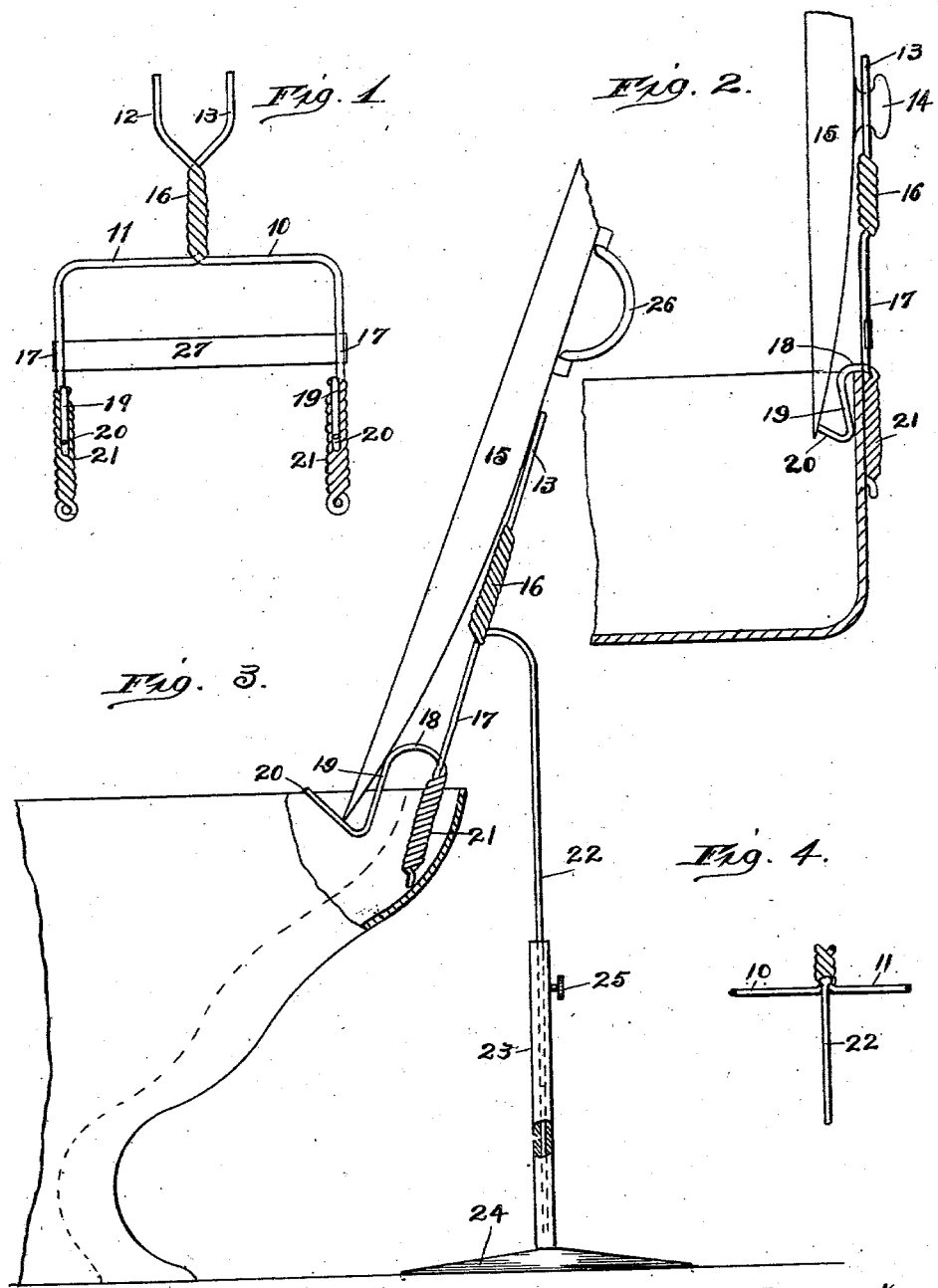

No. 746,878. Patented December 15, 1903.

UNITED STATES PATENT OFFICE.

CHARLES F. REICHELT, OF CHICAGO, ILLINOIS.

SUPPORT FOR VESSEL-COVERS.

SPECIFICATION forming part of Letters Patent No. 746,878, dated December 15, 1903.

Application filed March 2, 1903. Serial No. 145,658. (No model.)

*To all whom it may concern:*

Be it known that I, CHARLES F. REICHELT, a citizen of the United States, residing at Chicago, in the county of Cook and State of Illinois, have invented certain new and useful Improvements in Supports for Vessel-Covers, of which the following is a specification.

This invention relates to improvements in a device to be attached to a vessel or bowl or used in connection therewith to support the cover thereof when the same is removed, so as to expose the contents of the vessel; and it consists in certain peculiarities of the construction, novel arrangement, and operation of the parts thereof, as will be hereinafter more fully set forth, and specifically claimed.

The principal object of the invention is to provide a support of the above-named character which shall be simple and inexpensive in construction, and which may be attached to the wall of the vessel at its upper rim or edge in such a manner that it will not interfere with placing the cover thereof so as to close the vessel, yet will be ever ready to receive and retain the cover in an upright or inclined position, so that the condensed steam on the inner surface thereof may be drained back into the vessel or bowl.

Another object of the invention is to so construct it that it may be adjusted to any desired height and attached or used in connection with the bowl or vessel.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a detached front or face view of the support embodying one form of my invention. Fig. 2 is a side view, partly in section and partly in elevation, showing the support attached to a portion of a vessel and illustrating a portion of the cover in its supported position. Fig. 3 is a view in side elevation, partly in section, of a portion of a bowl or vessel, showing a modified form in the construction of the support and illustrating different ways of using the same in connection with the vessel or bowl; and Fig. 4 is a rear view of a portion of the support and a part of the adjustable stem or rod therefor.

Like numerals of reference refer to corresponding parts throughout the different views of the drawings.

The support comprises two members 10 and 11, which are made of wire, and are spirally wrapped or twisted around each other at their upper portions and have their free upper ends 12 and 13 separated to form a fork to receive the knob 14 on the outer surface of the cover 15 when the same is provided with a knob or the like. As shown in Fig. 1 of the drawings, the members 10 and 11 are bent so as to extend laterally at about right angles from the lower portion of the twisted part 16 or body portion, and are then each bent downwardly to form the depending portions 17, which may extend in said direction to any desired length or distance. Each of the depending portions 17 is bent upwardly at its lower end and twisted around itself and then bent inwardly, as at 18, and then downwardly, as at 19, and again inwardly and upwardly to form the supporting-arms 20 for the rim of the cover 15 to rest on when it is so desired.

When placed in position on the rim of the vessel, as shown in Fig. 2 and by dotted lines in Fig. 3, it is apparent that the inwardly-extending portions 18 of the depending parts 17 will rest on the top edge of the vessel in such a manner as not to interfere but slightly with the placing of the cover thereon when it is desired to close the vessel. It is further evident by reference to the drawings that the portions 19, together with the twisted portions 21, will form clamps to securely retain the support in position.

In Figs. 3 and 4 of the drawings I have illustrated a modification in the construction of the support, which consists in securing a rod 22 to the members 10 and 11 at their juncture, which rod extends downwardly and fits in a tube 23, which is vertically supported by means of a base 24, of any suitable size, form, and material. The tube 23 is provided near its upper end with a set-screw 25 to engage the rod 22, so as to enable it to be raised and lowered in said tube, so as to adjust the support to bowls or basins of different heights. Instead of clamping the support to the walls of the vessel or bowl, as shown in Fig. 2, the lower ends of the depending arms 17 may be placed within the vessel when the adjustable supporting-standards 22 and 23 are employed, as is shown by continuous lines in Fig. 3. However, the modified form of the support may be used so as to clamp the walls of the vessel, as shown by dotted lines in said figure.

From the foregoing and by reference to the drawings it will be clearly seen and readily understood that when the covers are provided with knobs 14 or ring-handles 26, by means of which they are lifted from the vessels, they may be placed on the support so that the prongs 12 and 13 will engage the knobs or rings; but when they are not provided with either or it is desired to otherwise support the covers they may be rested at their rims or edges on the inwardly-projecting arms 20 of the support. The depending portions 17 may be connected together by means of a band or piece 27, located just above the clamping members.

Having thus fully described my invention, what I claim as new, and desire to secure by Letters Patent, is—

1. A support for vessel-covers consisting of two wire members twisted together in their upper portions to form a body and having their upper ends separated to form a fork, said members being bent laterally at right angles to the body in opposite directions from their juncture, and then downwardly, then each twisted upwardly around itself at its lower portion, then bent inwardly and downwardly and again inwardly and upwardly to form clamping members for the vessel and supporting-arms for the cover, said arms being substantially parallel with one another, and integral with the members, substantially as described.

2. A support for vessel-covers comprising a body portion bifurcated at each of its ends, the lower prongs extending laterally from said body and then downwardly, the lower portion of each of the lower prongs being bent upwardly back upon itself, then inwardly and downwardly and again inwardly and upwardly to form clamping members for the vessel and supporting-arms for the cover, said arms being substantially parallel with one another and integral with the members, substantially as described.

3. A support for vessel-covers consisting of two wire members joined together in their upper portions and having their upper ends separated to form a fork, said members being bent laterally in opposite directions from their juncture, and then downwardly, then each twisted upwardly around itself at its lower portion, then bent inwardly and downwardly and again inwardly to form clamping members and supporting-arms, a rod fixed to the rear portion of said members at their juncture, and a vertically-supported tube receiving said rod and having means to adjustably secure it therein, substantially as described.

CHARLES F. REICHELT.

Witnesses:
 CHAS. C. TILLMAN,
 A. GUSTAFSON.